(12) United States Patent
Kaji

(10) Patent No.: US 10,144,252 B2
(45) Date of Patent: Dec. 4, 2018

(54) PNEUMATIC TIRE

(71) Applicant: TOYO TIRE & RUBBER CO., LTD., Osaka-shi, Osaka (JP)

(72) Inventor: Shinichi Kaji, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 238 days.

(21) Appl. No.: 14/956,525

(22) Filed: Dec. 2, 2015

(65) Prior Publication Data

US 2016/0159161 A1 Jun. 9, 2016

(30) Foreign Application Priority Data

Dec. 3, 2014 (JP) ................. 2014-245061

(51) Int. Cl.
*B60C 11/13* (2006.01)
*B60C 11/03* (2006.01)
*B60C 11/11* (2006.01)
*B60C 11/12* (2006.01)

(52) U.S. Cl.
CPC ......... *B60C 11/032* (2013.01); *B60C 11/11* (2013.01); *B60C 11/1323* (2013.01); *B60C 2011/0358* (2013.01); *B60C 2011/1245* (2013.01); *B60C 2011/1254* (2013.01); *B60C 2011/1338* (2013.01)

(58) Field of Classification Search
CPC ............ B60C 11/1307; B60C 11/1323; B60C 11/032; B60C 2011/1254; B60C 2011/1338

USPC .................................................. 152/209.21
See application file for complete search history.

(56) References Cited

U.S. PATENT DOCUMENTS

2007/0240801 A1* 10/2007 Tanaka ............... B60C 11/0302
152/209.21

FOREIGN PATENT DOCUMENTS

| JP | S60-80912 A | 5/1985 |
| JP | 64-47603 A | 2/1989 |
| JP | 2002-029226 | * 1/2002 |
| JP | 2002-36822 A | 2/2002 |
| JP | 2011-11695 A | 1/2011 |

OTHER PUBLICATIONS

English machine translation of JP2002-029226. (Year: 2002).*
Office Action dated Feb. 16, 2017, issued in counterpart Chinese Application No. 201510862031.2, with machine translation. (8 pages).

(Continued)

*Primary Examiner* — Robert C Dye
(74) *Attorney, Agent, or Firm* — Westerman, Hattori, Daniels & Adrian, LLP

(57) ABSTRACT

Provided is a pneumatic tire where grooves and blocks defined by the grooves are formed on a tread portion, wherein the block includes: a ground contact surface; a hole portion formed in a center portion of the ground contact surface; and sipes extending radially from the hole portion which is the center of radial extension of the sipes, and the sipes are formed such that inner ends of the sipes in a radial direction terminate at a position away from the hole portion, and outer ends of the sipes in the radial direction terminate within the block.

11 Claims, 24 Drawing Sheets

(56) References Cited

OTHER PUBLICATIONS

Office Action dated Apr. 23, 2018, issued in counterpart Japanese Application No. 2014-245061, with English machine translation. (4 pages).
Office Action dated Nov. 6, 2017, issued in counterpart Chinese Application No. 201510862031.2, with English machine translation. (10 pages).

* cited by examiner

PNEUMATIC TIRE

BACKGROUND OF THE INVENTION

Field of the Invention

The present invention relates to a pneumatic tire.

Description of the Related Art

Conventionally, with respect to pneumatic tires, there has been adopted a technique where cuts referred to as sipes are formed in blocks formed on a tread portion, and a traction performance (braking performance) on a road surface having a low friction coefficient such as an icy road surface is improved by an edge effect of the sipes.

On a road surface having a low friction coefficient, a ground contact pressure in a center region of the block is higher than a ground contact pressure in a peripheral region surrounding the center region. Accordingly, the ground contact pressure becomes non-uniform among the respective portions of the block thus deteriorating the ground contact property of the whole block. Because of such deterioration of the ground contact property of the block, a braking performance of the pneumatic tire on an icy road surface is deteriorated.

JP-A-2011-11695 and JP-A-1-47603 propose techniques where a plurality of sipes which extend radially from a center portion of a block are arranged on the block, and a recessed portion which communicates with the plurality of sipes is formed at the radial center of the sipes. In such a pneumatic tire, by arranging the sipes and the recessed portion on the center portion of the block, a ground contact pressure of the block can be made uniform between a center region and a peripheral region and hence, a braking performance of the pneumatic tire on an icy road surface can be improved.

However, in the pneumatic tires described in JP-A-2011-11695 and JP-A-1-47603, the plurality of sipes extending radially from the center portion of the block and the recessed portion arranged at the radial center of the sipes communicate with each other and hence, the center portion of the block is liable to fall. Accordingly, there arise drawbacks such as the occurrence of chipping of rubber at a connecting portion between the sipes and the recessed portion, the occurrence of crack initiating from an outer side edge of the sipe in the radial direction and nipping a foreign substance such as a small pebble in the recessed portion.

SUMMARY OF THE INVENTION

The invention has been made in view of such drawbacks, and it is an object of the invention to provide a pneumatic tire where a ground contact pressure is made uniform among respective portions of a block and hence, ground contact property of the whole block is improved whereby a braking performance on a road surface having a low friction coefficient such as an icy road surface can be improved and, at the same time the occurrence of chipping of rubber or cracks can be suppressed and hence, durability is enhanced.

According to one aspect of the invention, there is provided a pneumatic tire which includes: a tread portion; grooves formed on the tread portion; and blocks defined by the grooves, wherein the block includes: a ground contact surface; a hole portion formed in a center portion of the ground contact surface; and sipes extending radially from the hole portion which is the center of radial extension of the sipes, and the sipes are formed such that inner ends of the sipes in a radial direction terminate at a position away from the hole portion, and outer ends of the sipes in the radial direction terminate within the block.

In a preferred mode of the pneumatic tire of the invention, it is preferable that the block include a pair of side walls which face each other with the groove sandwiched therebetween, a first projecting ridge formed on one of the pair of the side walls, and a second projecting ridge formed on the other of the pair of the side walls, and the first projecting ridge and the second projecting ridge extend along the groove. In such a case, it is preferable that at least one of the first projecting ridge and the second projecting ridge be inclined such that a position of the projecting ridge in a groove depth direction changes along the groove, and the first projecting ridge intersect with the second projecting ridge as viewed from a width direction of the groove. It is also preferable that the second projecting ridge be inclined in a reverse direction of an inclination direction of the first projecting ridge. It is also preferable that the groove include lateral grooves formed at intervals in a tire circumferential direction, and the first projecting ridge and the second projecting ridge be formed on the pair of the side walls which face each other with the lateral groove sandwiched therebetween, or at least one of the first projecting ridge and second projecting ridge be formed of a plurality of projecting ridges formed on the side wall at intervals in a groove depth direction.

According to the invention, durability can be improved by suppressing the occurrence of chipping of rubber, cracks and the like while improving a braking performance on a road surface having a low friction coefficient such as an icy road surface.

DETAILED DESCRIPTION OF THE INVENTION

Figure 1:
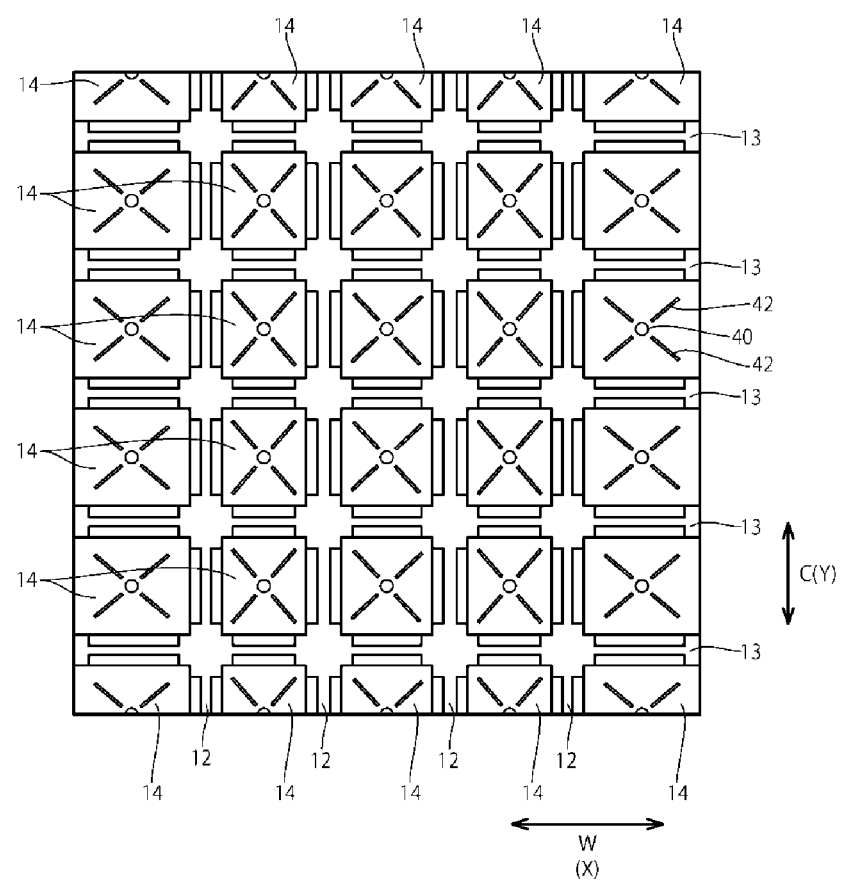
FIG. 1 is a plan view showing a tread pattern of a pneumatic tire according to one embodiment of the invention.

Hereinafter, one embodiment of the invention is explained with reference to drawings.

Although not shown in the drawing, a pneumatic tire according to this embodiment is constituted of: a pair of left and right bead portions; a pair of left and right side wall portions; and a tread portion 10 which is disposed between the left and right side wall portions so as to connect radially outer end portions of the left and right side wall portions to each other. The pneumatic tire includes a carcass which extends between and over the pair of bead portions.

The carcass is formed of at least one carcass ply which extends from the tread portion 10, passes through the side wall portions, and has both end portions thereof engaged with bead cores embedded in the bead portions respectively thus reinforcing the above-mentioned respective portions.

On an outer peripheral side of the carcass at the tread portion 10, a belt formed of a steel coat layer coated by rubber in two or more layers is mounted thus reinforcing the tread portion 10 on the outer periphery of the carcass.

In the pneumatic tire, as shown in FIG. 1, a plurality of grooves 12, 13, and a plurality of blocks 14 which are defined by these grooves 12, 13 are formed on a surface of the tread portion 10 which forms a ground contact surface 11.

In this embodiment, four circumferential grooves 12 which extend in a tire circumferential direction C, a plurality of lateral grooves 13 which are formed at intervals in the tire circumferential direction C and extend in the tire width direction W, and the blocks 14 which are defined by the circumferential grooves 12 and the lateral grooves 13 are formed on the tread portion 10. In this embodiment, the explanation is made with respect to the case where the circumferential grooves 12 are formed in a straight line shape, and the lateral grooves 13 are formed perpendicular to the circumferential grooves 12 so that blocks 14 having a rectangular shape in a plan view are formed. However, by forming the circumferential grooves 12 in a zigzag manner, or by forming the lateral grooves 13 in an inclined manner with respect to the circumferential grooves 12, a planar shape of the block 14 may be formed into a rectangular parallelepiped shape, a triangular shape, a trapezoidal shape or the like.

With respect to the blocks 14, projecting ridges 20a, 20b which project to the inside of the lateral groove 13 are formed on a pair of side walls 14a, 14b which faces each other in an opposed manner with the lateral groove 13 sandwiched therebetween along a direction X that the lateral groove 13 extends (in this embodiment, the direction X being equal to a tire width direction W). Further, projecting ridges 20c, 20d which project to the inside of the circumferential groove 12 are formed on a pair of side walls 14c, 14d which faces each other in an opposed manner with the circumferential groove 12 sandwiched therebetween along a direction that the circumferential groove 12 extends, that is, in the tire circumferential direction C in this embodiment.

Figure 3:
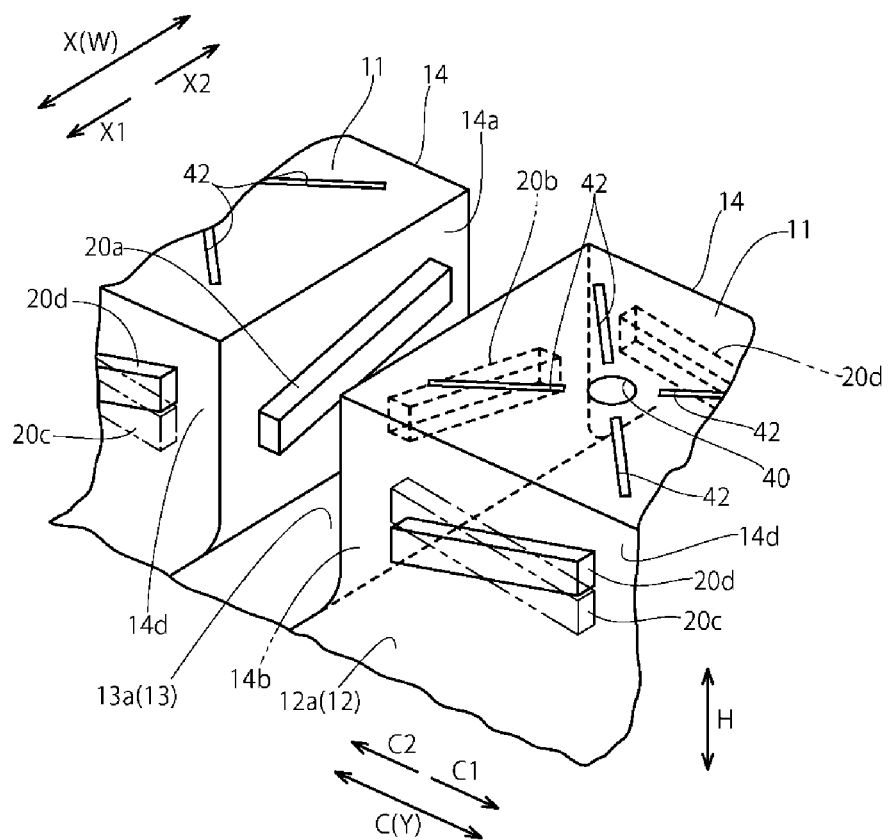
FIG. 3 is a perspective view of blocks of the pneumatic tire shown in FIG. 1.
Figure 4:
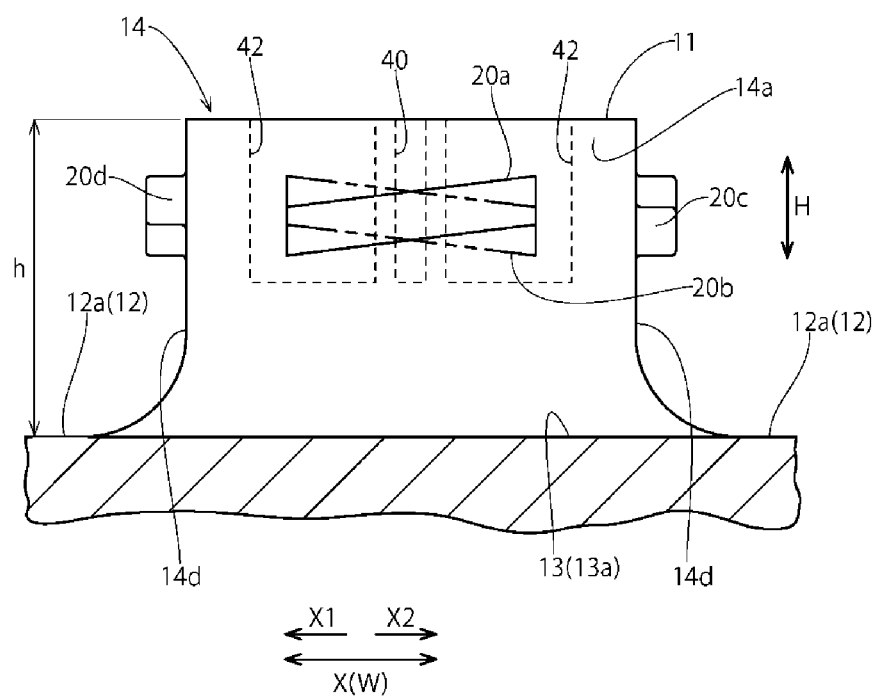
FIG. 4 is a cross-sectional view taken along a line A-A in FIG. 2.

The projecting ridges 20a, 20b formed on the pair of side walls 14a, 14b which faces each other in an opposed manner with the lateral groove 13 sandwiched therebetween and the projecting ridges 20c, 20d formed on the pair of side walls 14c, 14d which faces each other in an opposed manner with the circumferential groove 12 sandwiched therebetween have a rectangular shape having round corners in cross section respectively. The projecting ridges 20a, 20b, 20c, 20d are inclined such that the position of the projecting ridge in a groove depth direction H changes along the lateral groove 13 and the circumferential groove 12 (see FIG. 3 to FIG. 6). In FIG. 3, a double-dashed chain line indicates a state where the projecting ridge 20c formed on the side wall 14c of the block 14 which faces the projecting ridge 20d in an opposed manner with the circumferential groove 12 sandwiched therebetween is projected on the side wall 14d in the width direction of the circumferential groove 12, that is, the tire width direction W in this embodiment. In FIG. 4, a double-dashed chain line indicates a state where the projecting ridge 20b formed on the side wall 14b of the block 14 which faces the projecting ridge 20a in an opposed manner with the lateral groove 13 sandwiched therebetween is projected on the side wall 14a in the width direction Y of the lateral groove 13 (in this embodiment, the direction Y being equal to the tire circumferential direction C).

In this embodiment, out of the pair of side walls 14a, 14b which faces each other in an opposed manner with the lateral groove 13 sandwiched therebetween, the more the projecting ridge 20a formed on one side wall 14a extends toward one side X1 along the direction that the lateral groove 13 extends, the more the projecting ridge 20a is inclined downward so as to approach a groove bottom 13a. On the other hand, the more the projecting ridge 20b formed on the other side wall 14b which faces one side wall 14a in an opposed manner with the lateral groove 13 sandwiched therebetween extends toward the other side X2 along the direction that the lateral groove 13 extends, the more the projecting ridge 20b is inclined downward so as to approach a groove bottom 13a. The projecting ridge 20b formed on the other side wall 14b is inclined in a reverse direction of the inclination direction of the projecting ridge 20a formed on one side wall 14a. The projecting ridges 20a, 20b formed on the pair of side walls 14a, 14b are arranged such that the projecting ridges 20a, 20b intersect with each other at a center portion of the blocks 14 in the direction X that the lateral groove 13 extends as viewed in the width direction Y of the lateral groove 13 (see FIG. 4 and FIG. 5).

Further, out of the pair of side walls 14c, 14d which faces each other in an opposed manner with the circumferential groove 12 sandwiched therebetween, the more the projecting ridge 20c formed on one side wall 14c extends toward one side C1 along the direction that the circumferential groove 12 extends, the more the projecting ridge 20c is inclined downward so as to approach a groove bottom 12a. On the other hand, the more the projecting ridge 20d formed on the other side wall 14d which faces one side wall 14c in an opposed manner with the circumferential groove 12 sandwiched therebetween extends toward the other side C2 along the direction that the circumferential groove 12 extends, the more the projecting ridge 20d is inclined downward so as to approach a groove bottom 12a. In this case, the projecting ridge 20d formed on the other side wall 14d is inclined in a reverse direction of the inclination direction of the projecting ridge 20c formed on one side wall 14c. The projecting ridges 20c, 20d formed on the pair of side walls 14c, 14d are arranged such that the projecting ridges 20c, 20d intersect with each other at a center portion of the blocks 14 in the direction C that the circumferential groove 12 extends as viewed in the width direction W of the circumferential groove 12 (see FIG. 3).

Although the positions where the projecting ridges 20a, 20b, 20c, 20d are formed in the depth direction H of the lateral groove 13 and the circumferential groove 12 can be arbitrarily set, it is preferable to set the positions of the projecting ridges 20a, 20b, 20c, 20d as follows. An end portion of the projecting ridge 20a, 20b, 20c, 20d which approaches the groove bottoms 12a, 13a is arranged on a ground contact surface 11 side above a position which is 40% of depth h of the grooves 12, 13 measured from the groove bottoms 12a, 13a. An end portion of the projecting ridge 20a, 20b, 20c, 20d which approaches the ground contact surface 11 is arranged on a groove bottom 12a, 13a side below a position which is 90% of depth h of the grooves 12, 13 measured from the groove bottoms 12a, 13a. An intersection where the projecting ridges 20a, 20b intersect with each other and an intersection where the projecting ridges 20c, 20d intersect with each other are arranged on a ground contact surface 11 side above a position which is 50% of the depth h of the grooves 12, 13 measured from the groove bottoms 12a, 13a.

Figure 2:
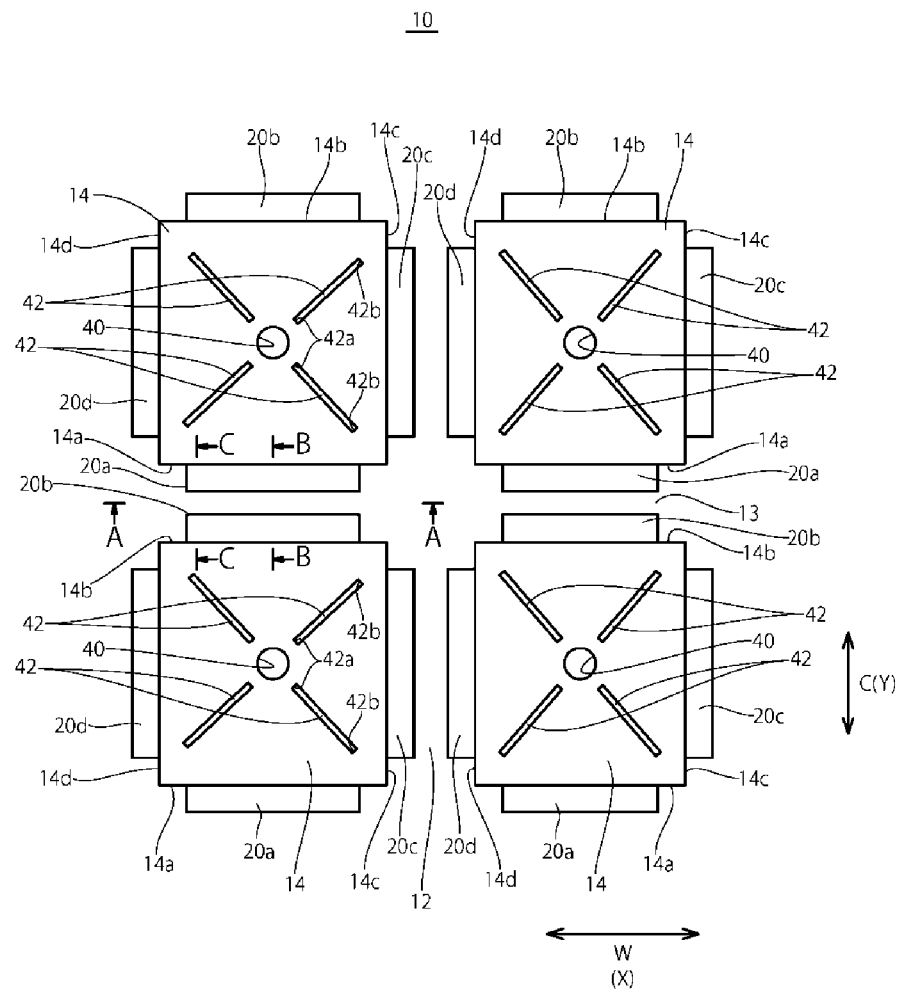
FIG. 2 is an enlarged view of an essential part of the tread pattern shown in FIG. 1.

As shown in FIG. 1 and FIG. 2, in each one of the plurality of blocks 14 formed on the tread portion 10, a hole portion 40 and a plurality of sipes 42 which open at a ground contact surface 11 are formed.

The hole portion 40 is a circular columnar recess indented in a depth direction (tire radial direction) H of the groove 12, 13, wherein the hole portion 40 has a circular opening which opens at the ground contact surface 11, and the hole portion 40 is formed in a center portion of the block 14. A plurality of sipes 42 are arranged radially about the hole portion 40. The plurality of sipes 42 respectively have an inner end extending in a radial direction (an end portion close to the hole portion 40) 42a which terminates at a position outwardly away from the hole portion 40, and an outer end extending in a radial direction (an end portion which is close to the side wall 14a, 14b, 14c, 14d of the block 14) 42b which terminates within the block 14 without opening at the side wall 14a, 14b, 14c, 14d of the block 14. In this embodiment, four sipes 42 having the same length which extend linearly toward corner portions of the block 14 from positions outwardly away from the hole portion 40 are formed in the block 14.

Here, to describe one example of respective sizes of the hole portion 40 and the sipes 42 formed in the ground contact surface 11 of the block 14, the ground contact surface 11 of the block 14 may be formed into a rectangular shape where each side is set to 30 mm to 37 mm, a depth of the lateral groove 13 and a depth of the circumferential groove 12 which define the blocks 14 may be set to 15 mm to 20 mm, a diameter of the hole portion 40 may be set to 2 to 5 mm, a length of the sipe 42 in the radial direction may be set to 10 to 15 mm, a width of the sipe 42 may be set to 0.3 to 0.6 mm, a distance between the hole portion 40 and the sipe 42 (a distance between the hole portion 40 and the inner end 42a of the sipe 42 in the radial direction) may be set to 2 to 4 mm, and respective depths of the hole portion 40 and the sipes 42 (lengths from the ground contact surface 11 to the bottom portion of the hole portion 40 and the bottom portion of the sipes 42) may be set to 10 to 15 mm. For example, the depth of the hole portion 40 may be set to 50% or less of the depth h of the groove 12, 13. For example, the depth of the sipe 42 may be set to 75% or less of the depth h of the groove 12, 13.

Further, with respect to the respective depths of the hole portion 40 and the sipes 42 formed in the block 14, the depth of the hole portion 40 and the depth of the sipe 42 may be set equal or the depth of the hole portion 40 and the depth of the sipe 42 may be set different from each other. However, it is preferable that the depth of the sipe 42 be set larger than the depth of the hole portion 40.

In the pneumatic tire of this embodiment having the above-mentioned configuration, the hole portion 40 is formed in the center portion of the block 14, and the sipes 42 are formed in a radially extending manner from the hole portion 40 which is the center of radial extension of the sipes 42. Accordingly, a ground contact pressure of a peripheral portion of the sipe 42 is increased and hence, a ground contact pressure of a center region whose ground contact pressure is liable to be lower than a ground contact pressure of the peripheral region of the block can be increased. As a result, traceability of the block 14 to a road surface is improved with the formation of the hole portion 40 and the sipes 42 and, at the same time, a ground contact property of the whole block 14 can be improved thus improving a braking performance on a road surface having a low friction coefficient such as an icy road surface.

Further, the sipes 42 which extend radially from the hole portion 40 which is the center of radial extension of the sipes 42 respectively have the inner end 42a extending in a radial direction which terminates at a position away from the hole portion 40, and the outer end 42b extending in a radial direction which terminates within the block 14. Accordingly, the block minimally falls in the vicinity of the hole portion 40 and hence, the occurrence of chipping of rubber, cracks and the like can be suppressed whereby durability can be improved.

By forming the hole portion 40 and the sipes 42 in the ground contact surface 11 of the block 14, the rigidity of the whole block 14 is lowered. In this embodiment, however, the projecting ridges 20a, 20b, 20c, 20d are formed on the side walls 14a, 14b, 14c, 14d of the block 14, and the projecting portions 20a, 20b, 20c, 20d compensate for lowering of the rigidity of the block caused by the formation of the hole portion 40 and the sipes 42. Accordingly, excessive falling of the block 14 can be prevented and hence, the decrease of a ground contact area can be suppressed whereby a braking performance on a road surface having a low friction coefficient such as an icy road surface can be improved and, at the same time, the generation of a non-uniform wear of the block 14 caused by excessive falling of the block 14 can be suppressed.

According to this embodiment, the pair of projecting ridges 20a, 20b which is formed on the pair of side walls 14a, 14b oppositely facing each other with the lateral groove 13 sandwiched therebetween is inclined such that the position of each projecting ridge in the groove depth direction H changes along the lateral groove 13, and the projecting ridges 20a, 20b are arranged such that the projecting ridges 20a, 20b intersect with each other as viewed in the width direction Y of the lateral groove 13. The pair of projecting ridges 20c, 20d which is formed on the pair of side walls 14c, 14d oppositely facing each other with the circumferential groove 12 sandwiched therebetween is inclined such that the position of each projecting ridge in the groove depth direction H changes along the circumferential groove 12, and the projecting ridges 20c, 20d are arranged such that the projecting ridges 20c, 20d intersect with each other as viewed in the width direction W of the circumferential groove 12. Due to such a configuration, when the block 14 falls down toward the inside of the lateral groove 13, there is no possibility that one of the pair of projecting ridges 20a, 20b which face each other in an opposed manner sinks below the other projecting ridge and, before the projecting ridges 20a, 20b are brought into contact with the side walls 14b, 14a of the blocks 14 which face each other in an opposed manner, the projecting ridges 20a, 20b are surely brought into contact with each other. Accordingly, it is possible to prevent the excessive falling down of the blocks 14 thus suppressing the occurrence of non-uniform wear of the blocks 14 more effectively. Further, when the block 14 falls down toward the inside of the circumferential groove 12, in the same manner, before the projecting ridges 20c, 20d are brought into contact with the side walls 14c, 14d of the blocks 14 which face each other in an opposed manner, the projecting ridges 20c, 20d are surely brought into contact with each other. Accordingly, it is possible to prevent the excessive falling down of the blocks 14 thus suppressing the occurrence of non-uniform wear of the blocks 14 more effectively.

In this embodiment, the projecting ridges 20a, 20b are formed on both of the pair of side walls 14a, 14b which faces each other in an opposed manner with the lateral groove 13 sandwiched therebetween and the projecting ridges 20c, 20d are formed on both of the pair of side walls 14c, 14d which faces each other in an opposed manner with the circumferential groove 12 sandwiched therebetween. Accordingly, compared to a case where a projecting ridge is formed only on one of side walls facing each other in an opposed manner, it is possible to reduce projecting amounts of the projecting ridges 20a, 20b, 20c, 20d. Accordingly, when the projecting ridges 20a, 20b, 20c, 20d are brought into contact with each other, the projecting ridges 20a, 20b, 20c, 20d are minimally deformed so that the projecting ridges 20a, 20b, 20c, 20d can surely support the falling blocks 14.

The projecting ridges 20a, 20b are inclined such that the position of the projecting ridge in the groove depth direction H changes along the direction X that the lateral groove 13 extends, and the projecting ridges 20c, 20d are inclined such that the position of the projecting ridge in the groove depth direction H changes along the direction C that the circumferential groove 12 extends. Accordingly, even when a portion of the projecting ridge 20a, 20b, 20c, 20d is exposed to the ground contact surface 11 due to wear of the block 14, there is no possibility that the whole projecting ridge 20a, 20b, 20c, 20d is exposed to the ground contact surface 11 in the longitudinal direction of the projecting ridge 20a, 20b, 20c, 20d. Accordingly, a range where the grooves 13, 12 are closed by the projecting ridges 20a, 20b, 20c, 20d can be suppressed and hence, the lowering of drainage performance of the grooves 13, 12 caused by the projecting ridges 20a, 20b, 20c, 20d can be suppressed.

In this embodiment, the intersection where the projecting ridges 20a, 20b intersect with each other and the intersection where the projecting ridges 20c, 20d intersect with each other are arranged on a ground contact surface 11 side above the position which is 50% of the depth h of the groove 13, 12 measured from the groove bottom 13a, 12a. Accordingly, when the block 14 falls down toward the inside of the groove 13, 12, the projecting ridges 20a, 20b, 20c, 20d are brought into contact with each other at an early stage of the falling and hence, the falling of the block 14 can be suppressed more effectively.

Further, with respect to the depths of the hole portion 40 and the sipes 42 formed in the block 14, the depth of the hole portion 40 and the depth of the sipes 42 may be set equal or the depth of the hole portion 40 and the depth of the sipes 42 may be set different from each other. However, it is preferable that the depth of the sipes 42 is larger than the depth of the hole portion 40.

In an initial stage of wear where the block 14 is not largely worn, the block 14 is easily deformed so that the ground contact pressure distribution is liable to become non-uniform. However, in a middle stage of wear or succeeding stages of wear where the block 14 is worn to some extent (approximately 50% of the depth h of the grooves 12, 13), the deformation of the block 14 becomes difficult compared to the deformation of the block 14 in the initial stage of wear and the non-uniformity of the ground contact pressure is alleviated. Accordingly, by setting the depth of the sipes 42 larger than the depth of the hole portion 40, the hole portion 40 and the sipes 42 are opened in the ground contact surface 11 in an initial stage of wear, and only the sipes 42 are opened in the ground contact surface 11 in a middle stage of wear and succeeding stages of wear, the ground contact pressure distribution of the block 14 can be made uniform corresponding to a wear state of the block 14.

Further, by setting of the depth of the sipes 42 larger than the depth of the hole portion 40, it is possible to prevent the occurrence of the case where the depth of the hole portion 40 becomes large more than necessary in an initial stage of wear so that the rigidity of the block 14 in the vicinity of the hole portion 40 becomes excessively low. Accordingly, a portion of the block 14 in the vicinity of the hole portion 40 is minimally damaged by an external force. Further, the sipes 42 open at the ground contact surface 11 even in a middle stage of wear and succeeding stages of wear and hence, a drive force can be ensured by the sipes 42 whereby safety can be enhanced.

(Modification 1)

Figure 7:
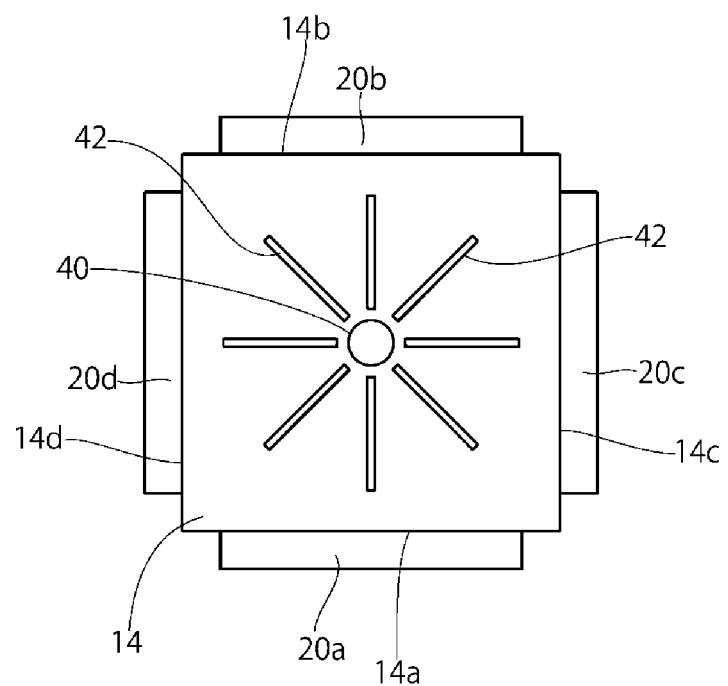
FIG. 7 is a plan view of a block according to a modification 1 of the invention.
Figure 8:
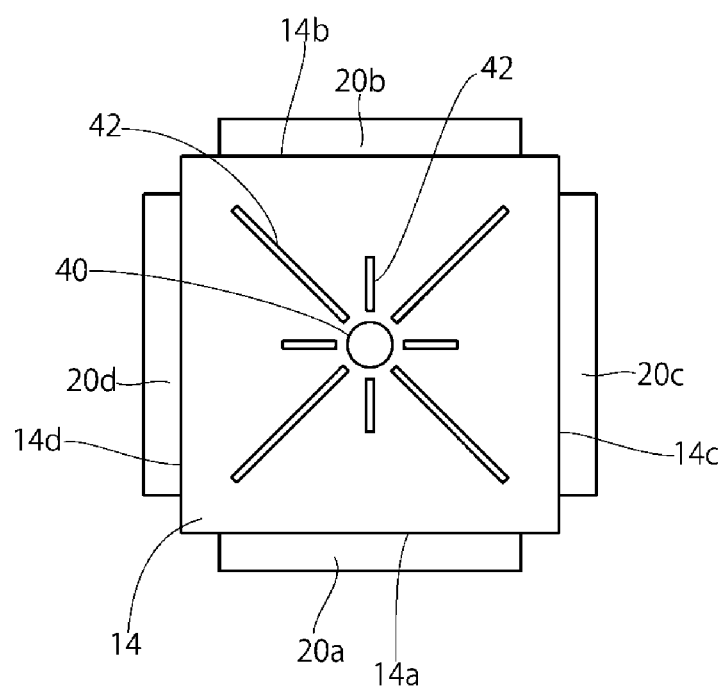
FIG. 8 is a plan view of the block according to the modification 1 of the invention.
Figure 9:
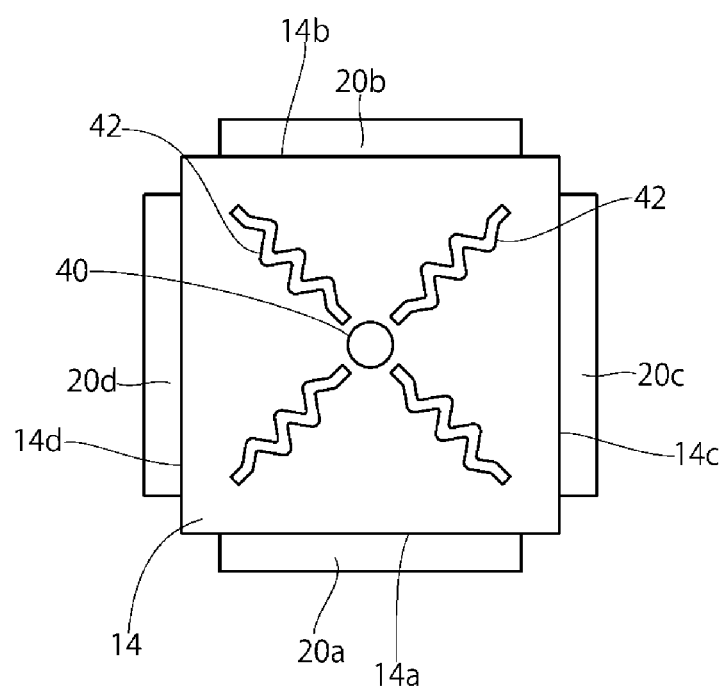
FIG. 9 is a plan view of the block according to the modification 1 of the invention.

In the above-mentioned embodiment, four sipes 42 which extend linearly toward the corner portions of the block 14 from the positions outwardly away from the hole portion 40 are formed in the block 14. However, the number, a length and a shape of the sipes 42 are not particularly limited. For example, as shown in FIG. 7, eight sipes having the same length may be formed at equal intervals around the hole portion 40. As another case, as shown in FIG. 8, the sipes 42 may be formed of four sipes which extend toward corner portions of a block from a position outwardly away from a hole portion 40, and four sipes 42 which extend toward side walls 14a, 14b, 14c, 14d of the block 14 and have a length shorter than a length of these sipes 42 extending toward the corner portions. As still another case, as shown in FIG. 9, four sipes 42 which extend in a zigzag shape toward corner portions of a block 14 from positions outwardly away from a hole portion 40 may be formed in a block 14.

(Modification 2)

Figure 5:
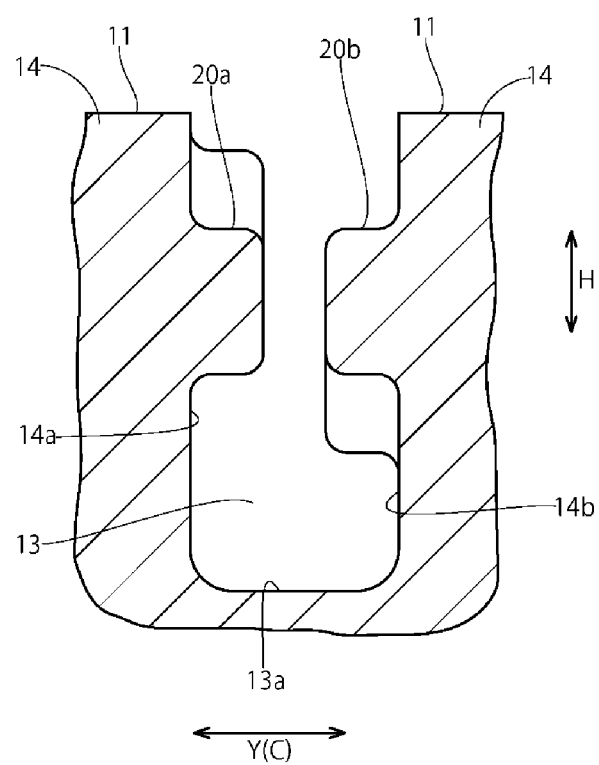
FIG. 5 is a cross-sectional view taken along a line B-B in FIG. 2.
Figure 6:
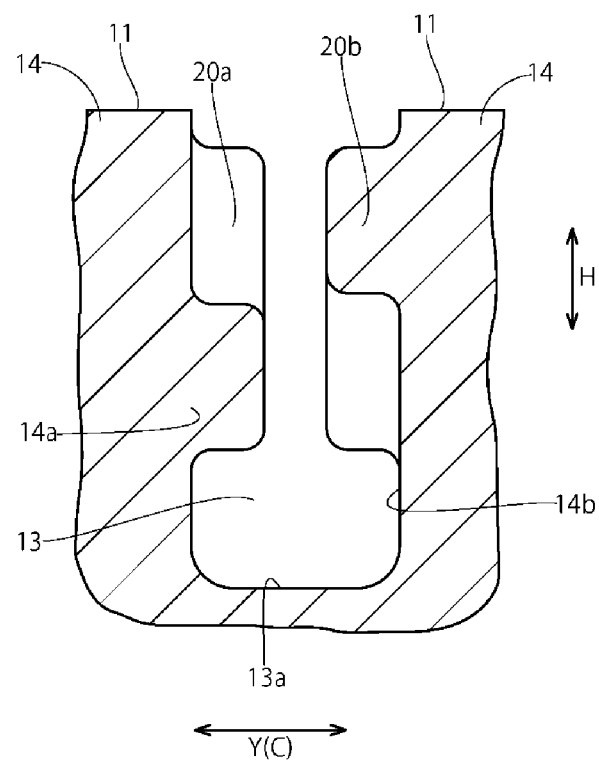
FIG. 6 is a cross-sectional view taken along a line C-C in FIG. 2.
Figure 10:
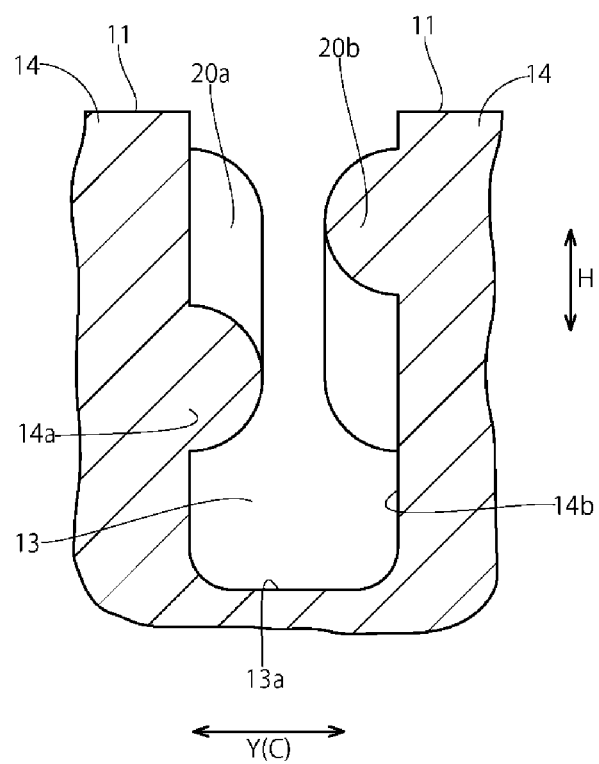
FIG. 10 is a cross-sectional view of a block according to a modification 2 of the invention.
Figure 11:
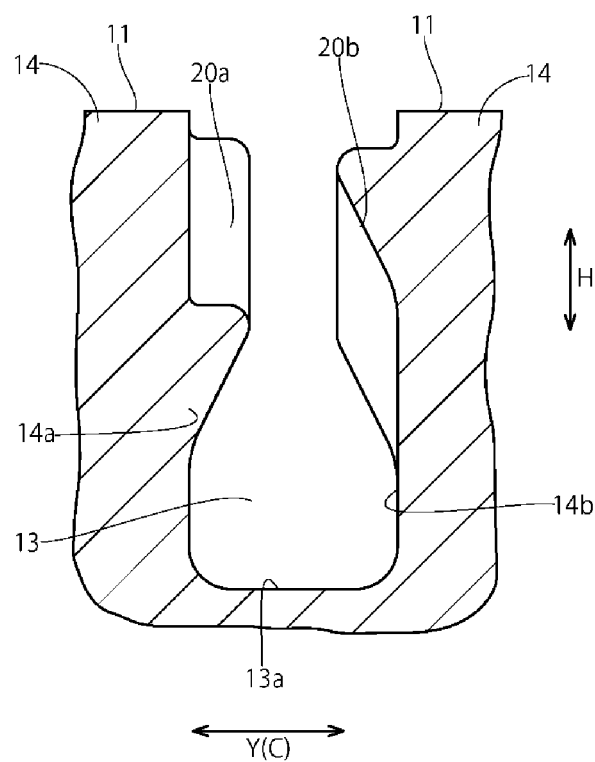
FIG. 11 is a cross-sectional view of the block according to the modification 2 of the invention.

In the above-mentioned embodiment, the projecting ridges 20a, 20b, 20c, 20d are formed into a rectangular shape having round corners in cross section as shown in FIG. 4 and FIG. 5. However, a cross-sectional shape of the projecting ridges 20a, 20b, 20c, 20d is not particularly limited, and the cross-sectional shape of the projecting ridges 20a, 20b, 20c, 20d may be formed into a semicircular shape shown in FIG. 10, a triangular shape having round corners shown in FIG. 11 or the like. For example, as shown in FIG. 11, assume a case where a cross-sectional shape of the projecting ridges 20a, 20b, 20c, 20d is a triangular shape having: a surface which is perpendicular to the side wall 14a, 14b, 14c, 14d and is arranged on a ground contact surface 11 side; and an inclined surface which is inclined such that a projecting amount of the inclined surface from the side wall 14a, 14b, 14c, 14d is gradually decreased as the inclined surface extends toward the groove bottom 13a, 12a and is arranged on a groove bottom 13a, 12a side. With such a configuration, at the time of removing a building mold for molding a pneumatic tire, the building mold is minimally caught by the projecting ridges 20a, 20b, 20c, 20d and hence, the projecting ridges 2 20a, 20b, 20c, 20d are minimally broken. Accordingly, it is preferable to form the projecting ridges 20a, 20b, 20c, 20d into such a triangular shape in cross section.

(Modification 3)

Figure 12:
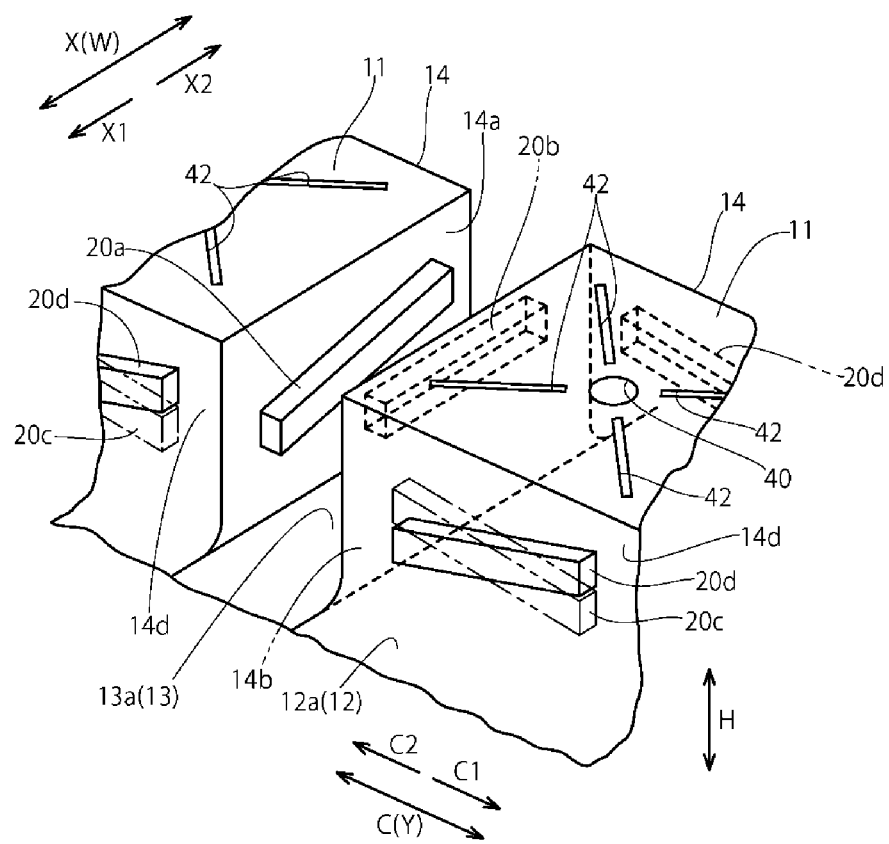
FIG. 12 is a perspective view of a block according to a modification 3 of the invention.
Figure 13:
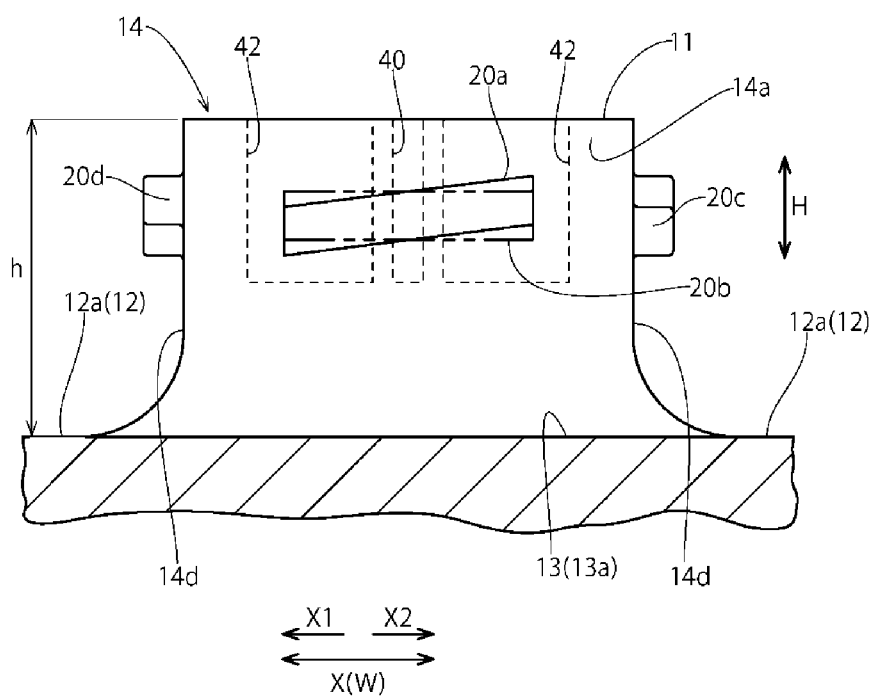
FIG. 13 is a cross-sectional view of the block according to the modification 3 of the invention.

In the above-mentioned embodiment, the explanation has been made with respect to the case where both of the projecting ridges 20a, 20b are formed in an inclined manner such that the position of the projecting ridge in the groove depth direction H changes along the direction X that the lateral groove 13 extends. However, for example, as shown in FIG. 12 and FIG. 13, either one of projecting ridge 20a may be formed in an inclined manner, and the other projecting ridge 20b may be formed parallel to the groove bottom 13a, or both projecting ridges 20a, 20b may be arranged parallel to the groove bottom 13a. With respect to the projecting ridges 20c, 20d, in the same manner as the projecting ridges 20a, 20b, one of projecting ridges 20c, 20d may be arranged in an inclined manner, and the other projecting ridge may be arranged parallel to the groove bottom 12a, or both projecting ridges 20c, 20d may be arranged parallel to the groove bottom 12a.

(Modification 4)

Figure 14:
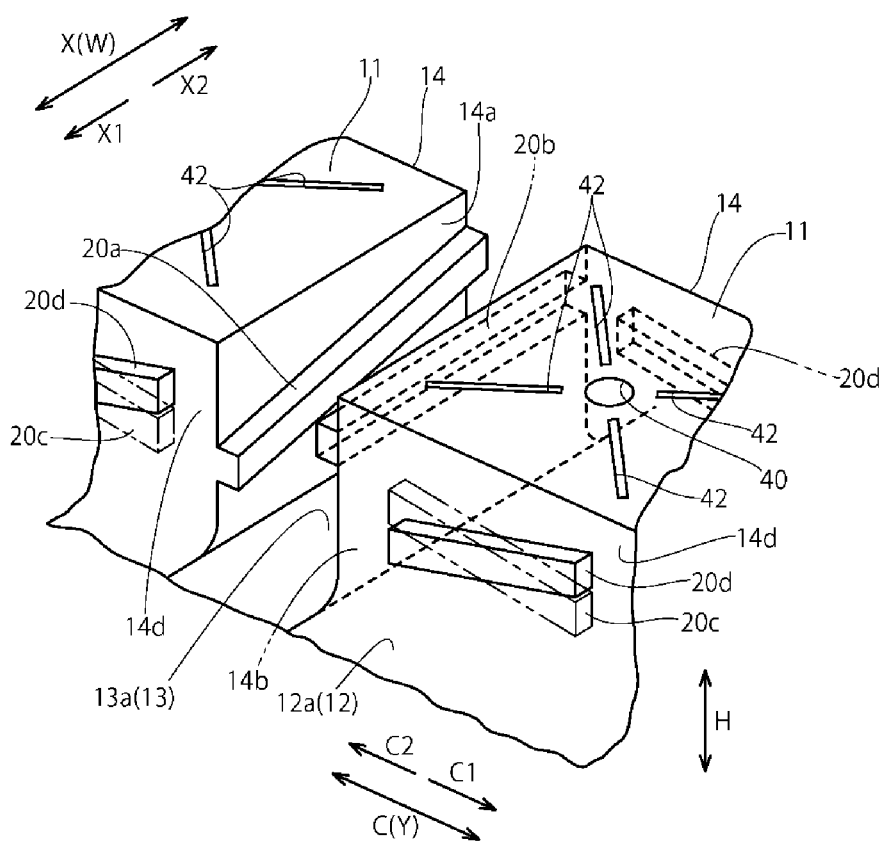
FIG. 14 is a perspective view of a block according to a modification 4 of the invention.
Figure 15:
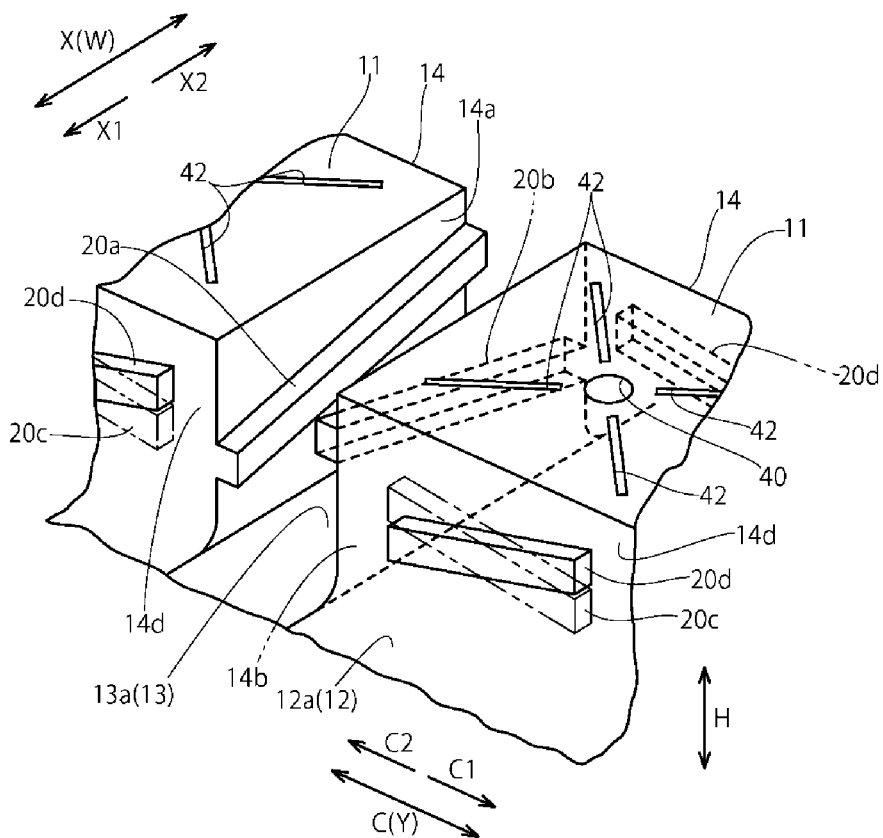
FIG. 15 is a perspective view of the block according to the modification 4 of the invention.

In the above-mentioned embodiment, as shown in FIG. 3 and FIG. 4, the end portions of the projecting ridges 20a, 20b in the direction X that the lateral groove 13 extends are positioned inside the edge portions of the block 14 respectively. However, as shown in FIG. 14 and FIG. 15, the end portions of the projecting ridge 20a, 20b in the direction X that the lateral groove 13 extends may be positioned at the edge portions of the block 14 respectively. Further, with respect to the projecting ridges 20c, 20d, in the same manner as the projecting ridges 20a, 20b, the end portions of the projecting ridges 20c, 20d in the direction C that the circumferential groove 12 extends may be positioned at the edge portions of the block 14 respectively.

(Modification 5)

Figure 16:
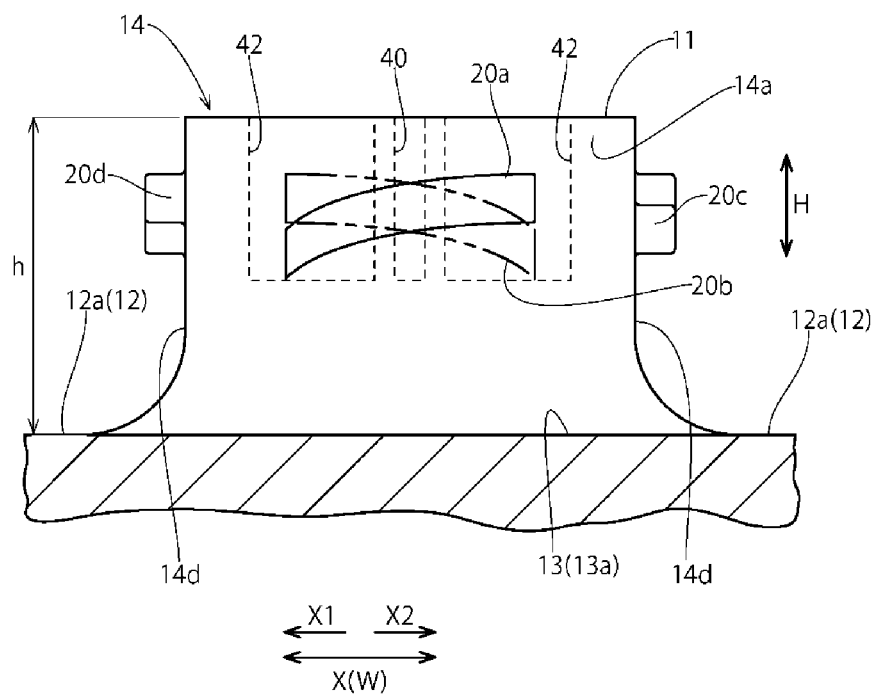
FIG. 16 is a cross-sectional view of a block according to a modification 5 of the invention.
Figure 17:
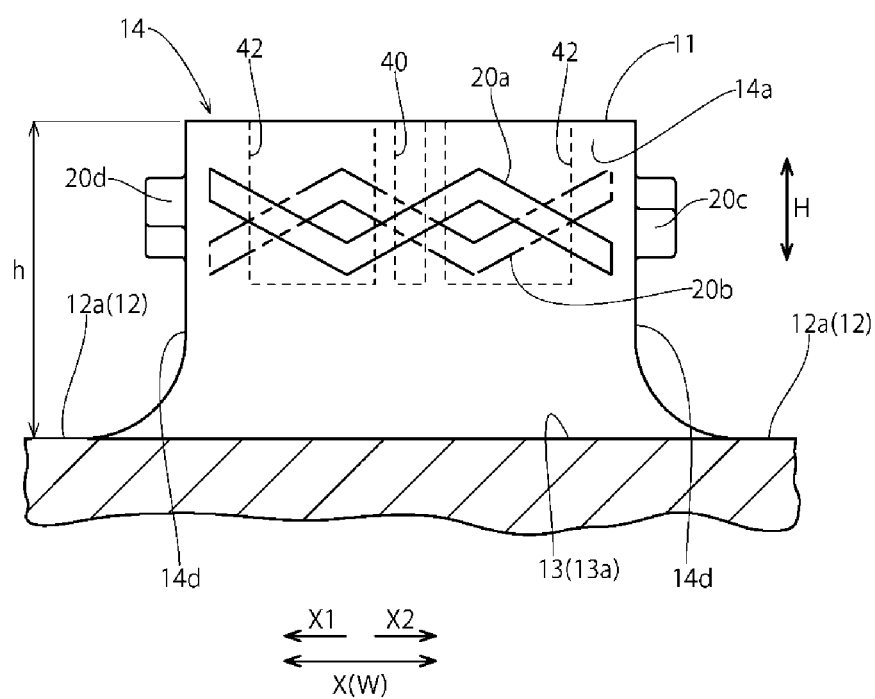
FIG. 17 is a cross-sectional view of the block according to the modification 5 of the invention.

In the above-mentioned embodiment, as shown in FIG. 4, the projecting ridges 20a, 20b are formed into a straight line shape as viewed in the width direction Y of the lateral groove 13 where the inclination direction of the projecting ridges 20a, 20b with respect to the direction X that the lateral groove extends is fixed and does not change. However, the projecting ridges 20a, 20b may be formed into a bent shape where the inclination direction of the projecting ridge 20a, 20b changes with respect to the direction X that the lateral groove 13 extends as shown in FIG. 16 or into a zigzag shape where an inclination direction changes as shown in FIG. 17. Further, with respect to the projecting ridges 20c, 20d, in the same manner as the projecting ridges 20a, 20b, the projecting ridges 20c, 20d may be formed into a bent shape where the inclination direction of the projecting ridge 20c, 20d changes with respect to the direction C that the circumferential groove 12 extends or into a zigzag shape where an inclination direction changes.

(Modification 6)

Figure 18:
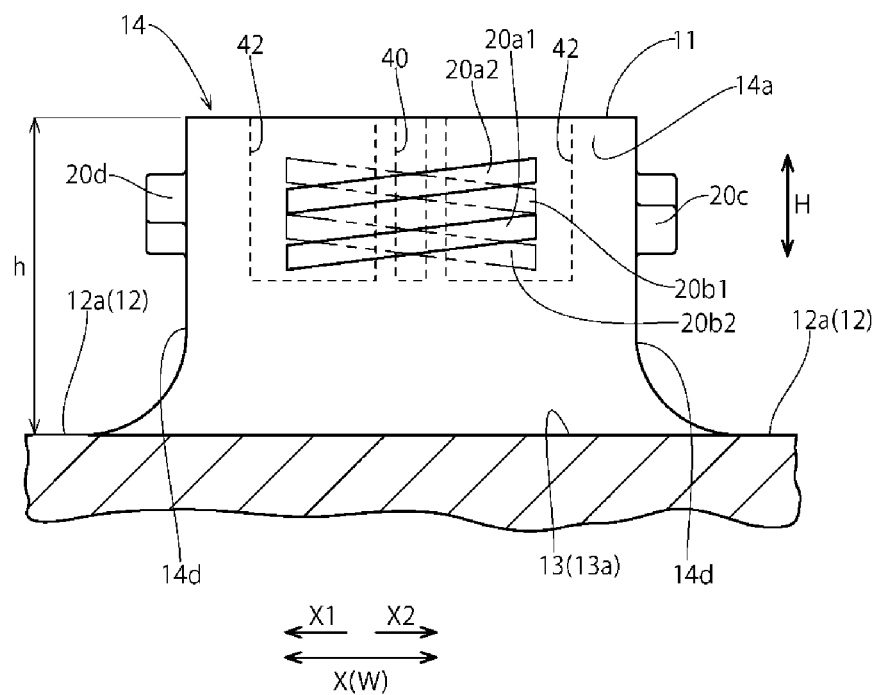
FIG. 18 is a cross-sectional view of a block according to a modification 6 of the invention.
Figure 19:
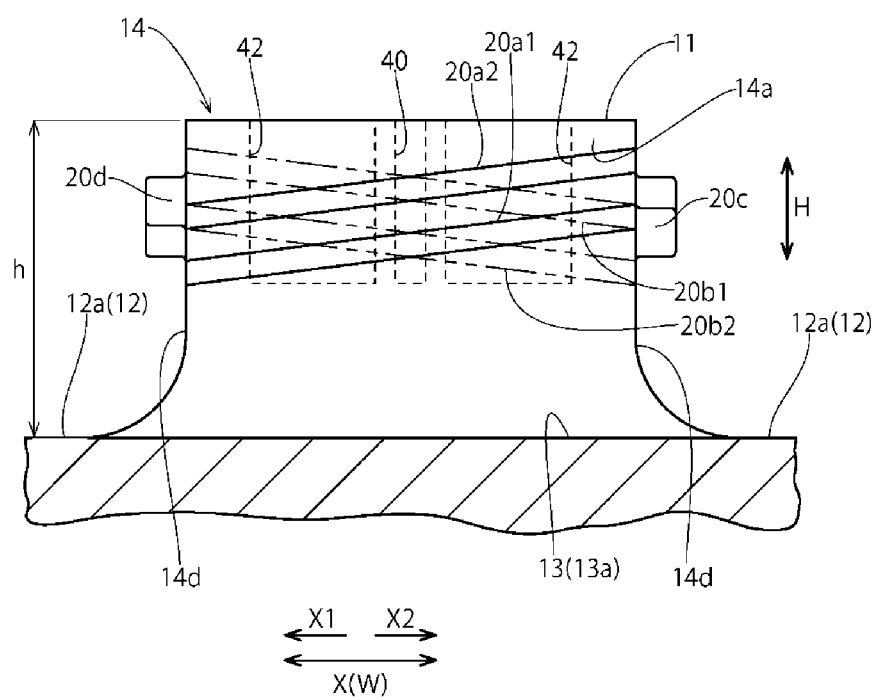
FIG. 19 is a cross-sectional view of the block according to the modification 6 of the invention.
Figure 20:
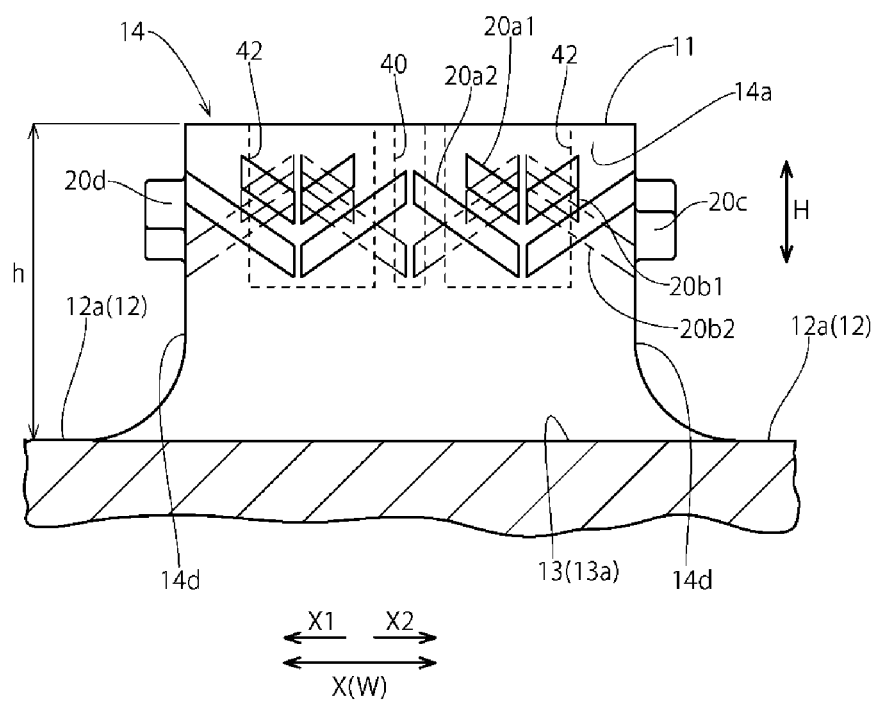
FIG. 20 is a cross-sectional view of the block according to the modification 6 of the invention.

In the above-mentioned embodiment, as shown in FIG. 3 to FIG. 6, the projecting ridges 20a, 20b are formed on the pair of side walls 14a, 14b which faces each other in an opposed manner with the lateral groove 13 sandwiched therebetween in a state where one projecting ridge 20a is formed on one side wall 14a and one projecting ridge 20b is formed on the other side wall 14b. However, as shown in FIG. 18 to FIG. 20, a plurality of projecting ridges 20a1, 20a2, 20b1, 20b2 may be formed on each one of side walls 14a at intervals in the groove depth direction H of the lateral groove 13. Further, with respect to the projecting ridges 20c, 20d, in the same manner as the projecting ridges 20a, 20b, a plurality of projecting ridges may be formed on each one of side walls at intervals in the groove depth direction H of the circumferential groove 12.

(Modification 7)

Figure 21:
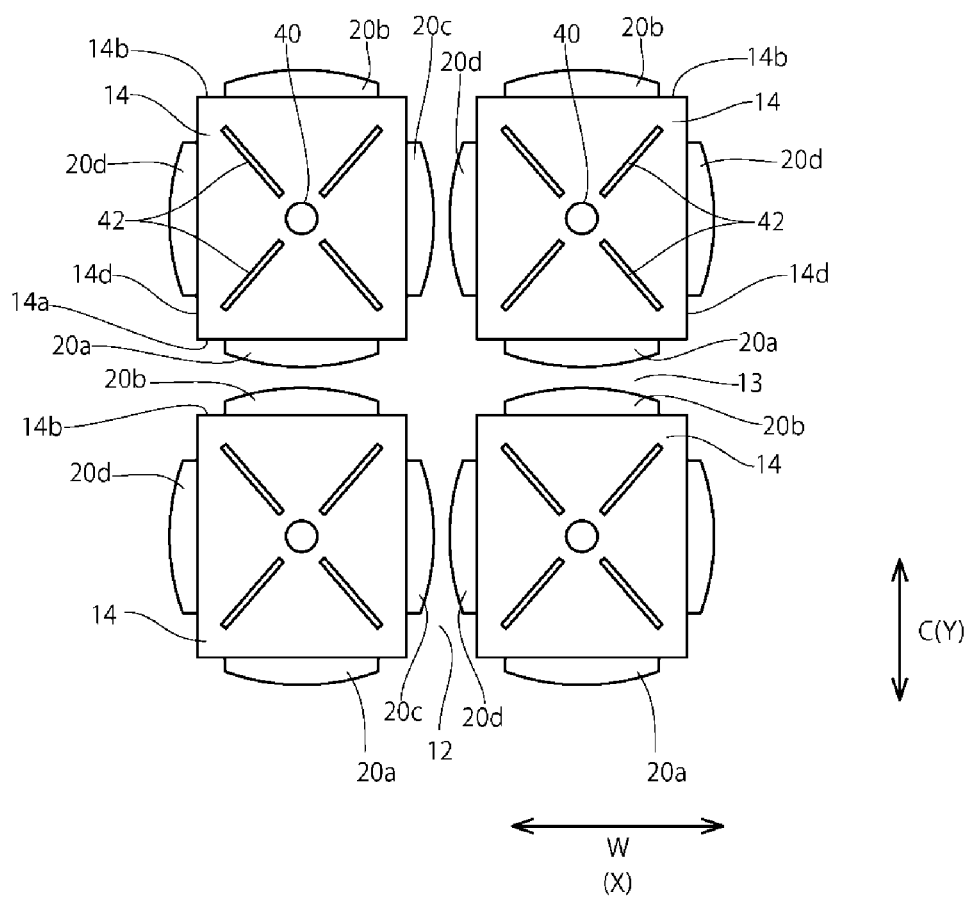
FIG. 21 is a plan view of a block according to a modification 7 of the invention.
Figure 22:
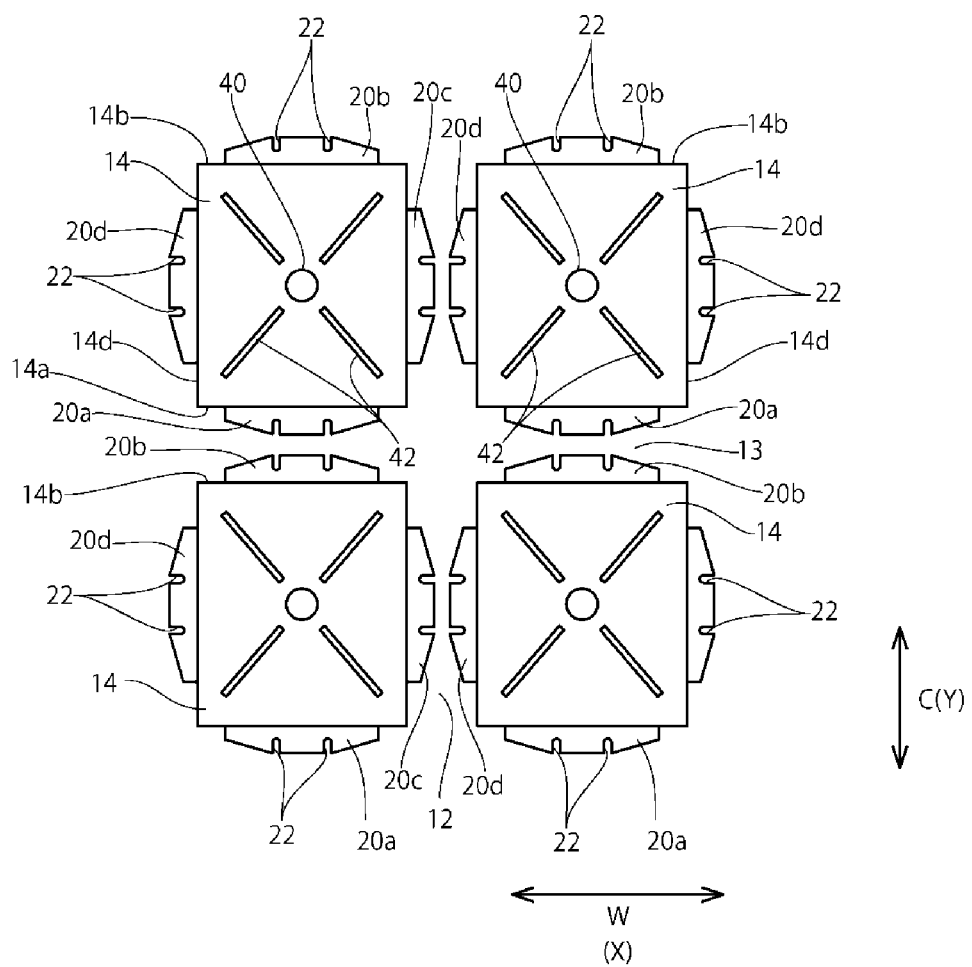
FIG. 22 is a plan view of the block according to the modification 7 of the invention.

In the above-mentioned embodiment, as shown in FIG. 1 and FIG. 2, the projecting ridges 20a, 20b, 20c, 20d are formed such that a projecting amount from the side wall 14a, 14b, 14c, 14d is fixed in the direction X that the lateral groove 13 extends or in the direction C that the circumferential groove 12 extends. However, as shown in FIG. 21, the projecting ridges 20a, 20b, 20c, 20d may be formed such that a projecting amount from the side wall 14a, 14b, 14c, 14d is large at a center portion of the block 14 in the direction X that the lateral groove 13 extends or in the direction C that the circumferential groove 12 extends, and a projecting amount is gradually decreased toward both end portions of the projecting ridge in the direction X that the lateral groove 13 extends or in the direction C that the circumferential groove 12 extends. Further, as shown in FIG. 22, cutout portions 22 which are recessed toward the side wall 14a, 14b, 14c, 14d may be formed on the projecting ridge 20a, 20b, 20c, 20d.

(Modification 8)

In the above-mentioned embodiment, in all blocks 14, the hole portion 40 and the sipes 42 are formed in the ground contact surface 11, and the projecting ridges 20a, 20b, 20c, 20d are formed on the side walls 14a, 14b, 14c, 14d. However, only the hole portion 40 and the sipes 42 may be formed on the blocks 14 without forming the projecting ridges 20a, 20b, 20c, 20d, or the hole portion 40 and the sipes 42 may be formed only some of the plurality of blocks 14 such that the hole portion 40 and the sipes 42 are formed in the blocks 14 positioned at a center portion of the tire in the tire width direction W.

(Other Embodiments)

The pneumatic tire of the above-mentioned embodiment exhibits an excellent braking performance on a road surface having a low friction coefficient such as an icy road surface and hence, the pneumatic tire of this embodiment is preferably applicable to a winter season tire such as a studless tire, an all season tire and the like. However, the pneumatic tire of this embodiment is also applicable to a so-cold summer season tire. The above-mentioned embodiments have been proposed as examples, and are not intended to restrict the scope of the invention. These novel embodiments and modifications can be carried out in other various modes, and various omissions, replacements and changes can be made without departing from the gist of the invention.

EXAMPLES

Hereinafter, the invention is explained more specifically with reference to examples. It must be noted here, however, that the invention is not limited to such examples.

Pneumatic tires according to the examples 1 to 3 and comparison examples 1 and 2 (tire size: 11R22.5 16P. R.) were manufactured as specimen tires. These specimen tires were manufactured under a condition that these specimen tires have the same tire internal structure and the same basic tread pattern, while these specimen tires differ from each other in the hole portion 40 and the sipes 42 formed in the ground contact surface 11 of the block 14 and the projecting ridges 20a, 20b, 20c, 20d formed on the side walls 14a, 14b, 14c, 14d of the block 14.

The example 1 is an example where although the hole portion 40 and four sipes 42 which extend radially from the positions outwardly away from the hole portion 40 are formed in the ground contact surface 11 of the block 14, projecting ridges are not formed on the side walls 14a, 14b, 14c, 14d of the block 14.

The example 2 is an example where a hole portion 40 and four sipes 42 similar to the hole portion 40 and the four sipes 42 in the example 1 are formed on a ground contact surface 11 of a block 14, and projecting ridges 20a, 20b, 20c, 20d arranged parallel to groove bottoms 13a, 12a are formed on side walls 14a, 14b, 14c, 14d of the block 14.

The example 3 corresponds to the above-mentioned embodiment, and is an example where a hole portion 40 and four sipes 42 similar to the hole portion 40 and four sipes 42 of the example 1 and the example 2 are formed on a ground contact surface 11 of a block 14, projecting ridges 20a, 20b are formed on side walls 14a, 14b of the block 14 such that the projecting ridges 20a, 20b are inclined so as to change positions thereof in a groove depth direction H along a lateral groove 13, and intersect with each other as viewed from a width direction Y of a lateral groove 13, and projecting ridges 20c, 20d are formed on side walls 14c, 14d of the block 14 such that the projecting ridges 20c, 20d are inclined so as to change positions thereof in the groove depth direction H along a circumferential groove 12 and intersect with each other as viewed from a width direction W of a circumferential groove 12.

Figure 23:
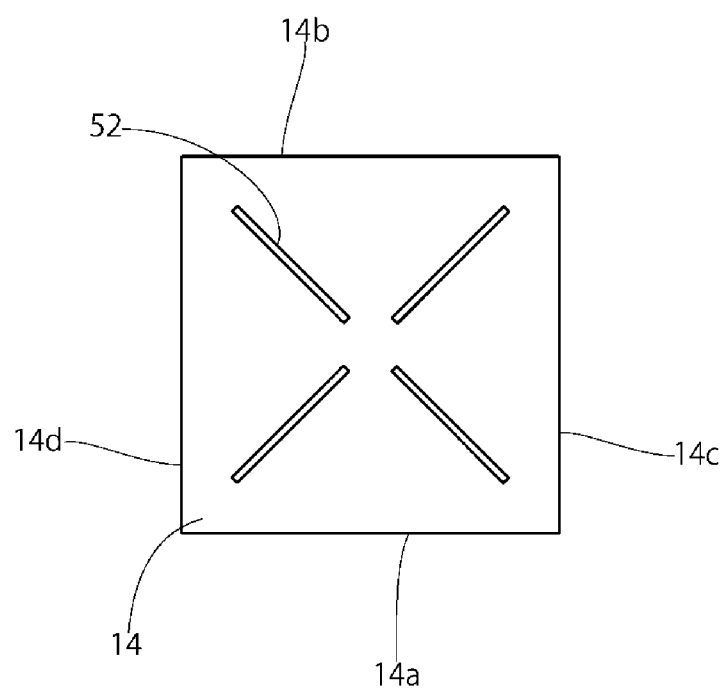
FIG. 23 is a plan view of a block of a pneumatic tire according to a comparison example 1.

A comparison example 1 is, as shown in FIG. 23, an example where although four sipes 52 extending radially are formed on a ground contact surface 11 of a block 14, a hole portion is not formed in the ground contact surface 11, and projecting ridges are not formed on side walls 14a, 14b, 14c, 14d of the block 14.

Figure 24:
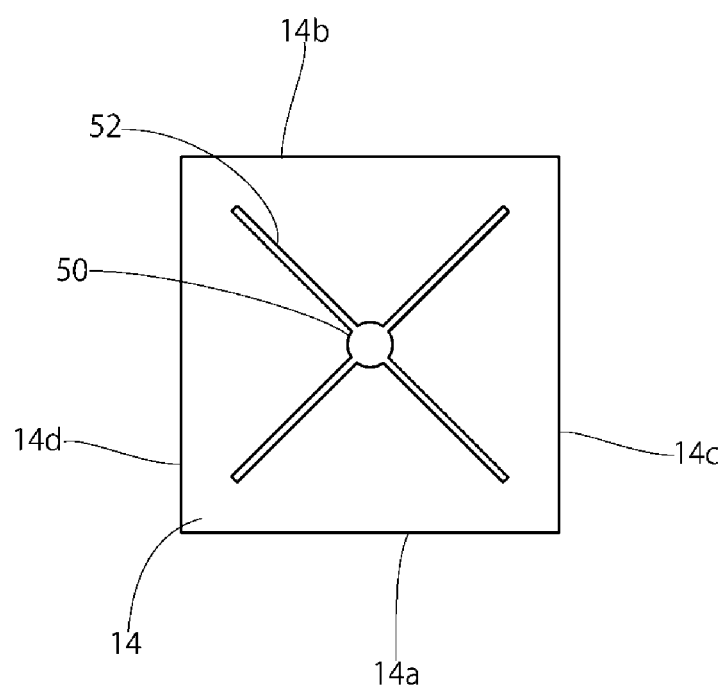
FIG. 24 is a plan view of a block of a pneumatic tire according to a comparison example 2.

A comparison example 2 is, as shown in FIG. 24, an example where a hole portion 50 and four sipes 52 extending radially from the hole portion 50 and communicating with the hole portion 50 are formed on a ground contact surface 11 of a block 14, and projecting ridges are not formed on side walls 14a, 14b, 14c, 14d of the block 14.

In the examples 1, 2, 3 and the comparison examples 1 and 2, a planar shape of the ground contact surface 11 of the block 14 is formed into a rectangular shape. Depths of the lateral grooves 13 and the circumferential grooves 12 which define the block 14 are set to 20 mm, a length of the sipes 42, 52 in the radial direction is set to 10 mm, a width of the sipes 42, 52 is set to 0.6 mm, a diameter of the hole portions 40, 50 is set to 3 mm, a distance between the hole portion 40 and the sipe 42 is set to 2 mm, and a depth of the hole portion 40, 50 is set to 8 mm, and a depth of the sipes 42, 52 is set to 13 mm.

The following evaluation was made with respect to the respective pneumatic tires according to the examples 1 to 3 and the comparison examples 1 and 2. The evaluation method was carried out as follows.

(1) Braking Performance on Ice

Each one of respective pneumatic tires of the examples 1 to 3 and the comparison examples 1 and 2 was assembled to a rim having sizes of 22.5×7.50, and the pneumatic tire was mounted on all wheels of a large truck (two occupants) having a total vehicle weight of 20 tons, and the truck was made to move on to a straight-line ice road surface at a speed of 30 km/h at an air pressure designated by the vehicle and under a load condition of 50% of maximum loading amount, and a distance from a position where braking started to a position where the vehicle stopped was measured. The evaluation is indicated by an index where an inverse number of a braking distance in the comparison example 1 is set to 100. The larger the numerical value, the more favorable braking performance can be acquired on ice.

(2) Non-Uniform Wear Resistant Performance

Each one of respective pneumatic tires according to examples 1 to 3 and the comparison examples 1 and 2 was assembled to a rim having a size of 22.5×7.50, air was filled in the tires until an inner pressure became 700 Kpa, and the tires were mounted on axles of a large truck having a total vehicle weight of 20 t and, thereafter, an amount of step wear between a stepping side of the block and a kicking-out side of the block was measured under a load condition of 80% of maximum loading capacity at a point of time that the truck traveled 5000 Km on a paved road and at a point of time that the truck traveled 30000 Km on a paved road.

(3) Block Chipping Resistant Performance

In the above-mentioned non-uniform wear resistant performance test, the number of chipping of rubber in the sipes or around the hole portion formed in the block were measured after the vehicle traveled 30,000 km. The evaluation is indicated by an index where an inverse number of the number of chipping of rubber in comparison example 1 is set to 100. The larger the numerical value, the more minimally chipping of rubber occurred thus exhibiting high block chipping resistant performance.

The result of the evaluation is shown Table 1. The hole portion 50 and the sipes 52 are formed in the block 14 in the comparison example 2 and hence, compared to the com-

TABLE 1

|  | COMPARISON EXAMPLE 1 | COMPARISON EXAMPLE 2 | EXAMPLE 1 | EXAMPLE 2 | EXAMPLE 3 |
|---|---|---|---|---|---|
| BRAKING PERFORMANCE ON ICE | 100 | 103 | 105 | 107 | 112 |
| NON-UNIFORM WEAR RESISTANT PERFORMANCE TRAVELED 5000 KM | 1.5 mm | 1.8 mm | 1.5 mm | 1.2 mm | 0.7 mm |
| NON-UNIFORM WEAR RESISTANT PERFORMANCE TRAVELED 30000 KM | 3.0 mm | 3.7 mm | 3.1 mm | 2.5 mm | 1.8 mm |
| BLOCK CHIPPING RESISTANT PERFORMANCE | 100 | 78 | 99 | 104 | 108 | parison example 1 where only the sipes 52 are formed in the block 14, the ground contact property of the whole block 14 was improved and hence, the traveling performance on an icy road surface was improved. However, the rigidity of the block 14 was lowered and hence, non-uniform wear resistant performance and block chipping resistant performance were deteriorated compared to the comparison example 1.

To the contrary, in the examples 1 to 3, the braking performance on ice was remarkably improved while ensuring non-uniform wear resistant performance and block chipping resistant performance at the substantially same level as the comparison example 1. Particularly, in the examples 2 and 3 where projecting ridges 20a, 20b, 20c, 20d are formed on the block 14, the non-uniform wear resistant performance and block chipping resistant performance were also remarkably improved in addition to the braking performance on ice compared to the comparison example 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pneumatic tire comprising:
   a tread portion;
   grooves formed on the tread portion; and
   blocks defined by the grooves, wherein
   respective blocks include: a ground contact surface; a hole portion formed in a center portion of the ground contact surface; and sipes extending radially from the hole portion which is the center of radial extension of the sipes,
   the hole portion has a circular opening which opens at the ground contact surface,
   the sipes are formed such that inner ends of the sipes in a radial direction terminate at a position away from the hole portion, and outer ends of the sipes in the radial direction terminate within the respective blocks, and
   a depth of the sipes is larger than a depth of the hole portion.

2. The pneumatic tire according to claim 1, wherein
   the respective blocks include side walls which face each other in an opposed manner with one of the grooves sandwiched therebetween, and at least a first projecting ridge formed on one of the side walls which face each other, and at least a second projecting ridge formed on an other of the side walls which face each other, and
   the first projecting ridge and the second projecting ridge extend along the one of the grooves.

3. The pneumatic tire according to claim 2, wherein
   at least one of the first projecting ridge and the second projecting ridge is inclined such that a position of the projecting ridge in a groove depth direction changes along the groove, and
   the first projecting ridge intersects with the second projecting ridge as viewed from a width direction of the groove.

4. The pneumatic tire according to claim 3, wherein
   the second projecting ridge is inclined in a reverse direction of an inclination direction of the first projecting ridge.

5. The pneumatic tire according to claim 2, wherein
   the one of the grooves is a lateral groove formed in a tire width direction, and
   the first projecting ridge and the second projecting ridge are respectively formed on the one of the side walls which face each other and the other of the side walls which face each other with the lateral groove sandwiched therebetween.

6. The pneumatic tire according to claim 3, wherein
   the one of the grooves is a lateral groove formed in a tire width direction, and
   the first projecting ridge and the second projecting ridge are respectively formed on the one of the side walls which face each other and the other of the side walls which face each other with the lateral groove sandwiched therebetween.

7. The pneumatic tire according to claim 4, wherein
   the one of the grooves is a lateral groove formed in a tire width direction, and
   the first projecting ridge and the second projecting ridge are respectively formed on the one of the side walls which face each other and the other of the side walls which face each other with the lateral grooves sandwiched therebetween.

8. The pneumatic tire according to claim 2, wherein
   the respective blocks include at least one of a plurality of the first projecting ridges formed on the one of the side walls at intervals in a depth direction of the one of the grooves and a plurality of second projecting ridges formed on the other of the side walls at intervals in a depth direction of the one of the grooves.

9. The pneumatic tire according to claim 2, wherein
   the respective blocks include at least one of a plurality of the first projecting ridges formed on the one of the side walls at intervals in a depth direction of the one of the grooves and a plurality of second projecting ridges formed on the other of the side walls at intervals in a depth direction of the one of the grooves, and
   at least one of the plurality of first projecting ridges and the plurality of second projecting ridges are inclined such that positions of the plurality of projecting ridges in the depth direction of the one of the grooves changes along the one of the grooves, and
   the plurality of first projecting ridges intersects with the plurality of second projecting ridges as viewed from a width direction of the one of the grooves.

10. The pneumatic tire according to claim 9, wherein
    the plurality of second projecting ridges are inclined in a reverse direction of an inclination direction of the plurality of first projecting ridges.

11. The pneumatic tire according to claim 2, wherein
    the respective blocks include at least one of a plurality of the first projecting ridges formed on the one of the side walls at intervals in a depth direction of the one of the grooves and a plurality of the second projecting ridges formed on the other of the side walls at intervals in a depth direction of the one of the grooves,
    the one of the grooves is a lateral groove formed in a tire width direction, and
    the plurality of first projecting ridges and the plurality of second projecting ridges are respectively formed on the one of the side walls which face each other and the other of the side walls which face each other with the lateral groove sandwiched therebetween.

* * * * *